UNITED STATES PATENT OFFICE.

KARL JEDLICKA, OF BASLE, SWITZERLAND, ASSIGNOR TO THE SOCIETY OF CHEMICAL INDUSTRY IN BASLE, OF SAME PLACE.

ORANGE DYE AND PROCESS OF MAKING SAME.

SPECIFICATION forming part of Letters Patent No. 666,095, dated January 15, 1901.

Application filed September 4, 1900. Serial No. 28,975. (Specimens.)

*To all whom it may concern:*

Be it known that I, KARL JEDLICKA, chemist and doctor of philosophy, a citizen of the Swiss Republic, and a resident of Basle, Switzerland, have invented a new Orange Dyestuff and the Process for its Manufacture, of which the following is a clear and complete specification.

In Letters Patent No. 537,723 there has been shown that the dyestuffs of the acridin series, called "acridin-yellow" and "benzoflavine," can be converted into alkylated dyestuffs by their treatment with alkylating agents. According to the working method and the nature of the employed alkylating agents the alkylation occurs in the amido group under formation of alkylamidoacridins of the general formula (a) 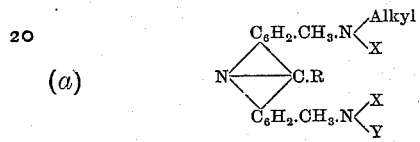

(in which R stands for hydrogen or phenyl and X and Y indicate hydrogen or an alkyl radical,) or in the acridin nitrogen under formation of so-called "amidoacridinium" derivatives of the formula (b) 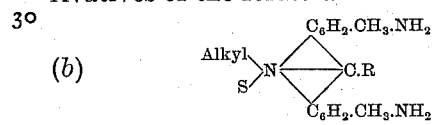

(in which S stands for the radical of an acid, as Cl, $SO_2\!\!<^{OH}_{O}$, &c., and R for hyrogen or phenyl.)

Combinations of the type (a) are formed by alkylating the heretofore-named dyestuffs of the acridin series in presence of mineral acids. (See Examples I and II of Letters Patent No. 537,723.) Dyestuffs of the type (b) are, on the contrary, chiefly formed by alkylating in a neutral or weakly alkaline medium in absence of acids. The preparation of these latter acridinium derivatives is described in another application for Letters Patent of mine, filed September 4, 1900, Serial No. 28,976.

The present invention is now based on the observation that the dyestuffs of the formulæ (a) and (b) can be further alkylated. I have found that by treating the dyestuffs of the type (a) with alkylating agents in a neutral or weakly alkaline medium in absence of mineral acids a further alkyl group can be introduced in the acridin nitrogen of the dyestuffs, which are thus converted into alkyl-amidoacridinium derivatives. On the other hand, the amidoacridinium derivatives of the type (b) may also be converted into alkyl-amidoacridinium derivatives by their alkylation in presence of acids, the alkylation occurring in this case in the amido groups. By taking the formulæ (a) and (b) in consideration it will be evident that in both cases the resulting final products are identical or very analogous. In fact, the dyestuffs obtained according to both ways cannot be distinguished in their chemical properties. Their constitution seems to correspond to the general formula (c) 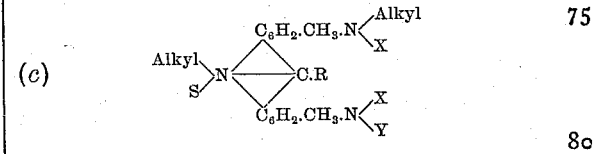

(in which R designs hydrogen or phenyl, X and Y hydrogen or an alkyl group, and S a radical of an acid.)

The conversion of the alkylamidoacridinium derivatives of the formula (a) into combinations of the formula (b) occurs in the best manner by treating the corresponding color bases with alkyl halides, ethereal salts of alphylsulfonic acids, or dimethylsulfate in presence of suitable indifferent solvents. By working with alkyl halides ethyl alcohol is preferably employed as solvent. If ethereal salts of alphylsulfonic acids or dimethylsulfate be employed, it is useful to employ a medium free of water—as, for example, nitrobenzene. The further alkylation of the amidoacridinium compounds of the formula (b) is preferably executed with alkylsulfates or a mixture of alcohol and concentrated sulfuric acid. The resulting dyestuffs are generally orange yellow to orange red and easily soluble in water. Their solutions are not changed by addition of sodium carbonate or of ammonia. Caustic soda gives in not too concentrated solutions of the dyestuffs either no precipitate of the color base or only after some time. On tannin-mordanted cotton and leather the new products furnish orange-yellow to orange-red shades of great purity and remarkable fastness to alkalies.

The invention will be fully explained by the following examples:

(a) *Conversion of the dyestuffs of the type (a) into dyestuffs of the type (c.)*

I. Twenty parts patentphosphin G as base prepared, according to Example II of Letters Patent No. 537,723, from acridin-yellow and methyl sulfate, are heated with eighty parts ethyl alcohol and ten parts methyl chlorid in an autoclave for about twelve hours at 100° to 110° centigrade. After the mass has cooled it is mixed with water, the alcohol distilled off, and from the filtered intensely orange-red solution the dyestuff is precipitated by an addition of sodium nitrate as a tile-red crystalline mass. In dry state the dyestuff is an orange-red powder, which dissolves easily in water to an orange-yellow solution. Its aqueous solution is, contrary to the aqueous solution of the parent material, not changed by addition of sodium carbonate or ammonia. Caustic soda precipitates the color base as orange-yellow flocks. It dyes tannin-mordanted cotton and leather fiery orange-yellow to orange-red tints of great purity. These tints are more reddish and clearer than the tints obtained with the parent material. By tipping the said tints obtained with the new dyestuff with ammonia or a solution of sodium carbonate they are not changed, while the tints obtained with patentphosphin G are changed by alkalies.

II. Twenty parts patentphosphin R as base prepared, according to Example II of Letters Patent No. 537,723, by energetical alkylation of acridin-yellow, are dissolved with aid of heat in fifty parts nitrobenzene. Nineteen parts of methyl paratoluenesulfonate are added and the mixture is heated for about fifteen minutes at 120° to 150° centigrade. After the nitrobenzene has been expelled by steam the resinous residue, which is pretty difficultly soluble in water and represents the paratoluenesulfonate of the formed acridinium compound, is digested with diluted caustic soda. The color base which is thus separated out is then dissolved in diluted hydrochloric acid and the solution obtained is heated and made weakly alkaline with ammonia in order to precipitate a small quantity of unattacked parent material and filtered. From the filtrate the dyestuff is precipitated by addition of sodium nitrate and common salt. When dried, it is a cinnabar-red powder easily soluble in water to an orange-red solution, which is not changed by sodium carbonate or ammonia. Caustic soda exercises no influence upon diluted solutions of the dyestuff. By adding caustic soda to concentrated solutions of the dyestuff they become first cloudy, and afterward the color base is precipitated as orange-yellow flocks. The dyestuff dyes tannin-mordanted cotton clear orange-red tints which are more reddish than the tints obtained with patentphosphin R and have the advantage of a greater fastness to alkalies.

If in the foregoing examples the specified derivatives of acridin-yellow are replaced by the corresponding derivatives of benzo-flavine or other dyestuffs of the alkylamido-acridin series, analogous coloring-matters are obtained. Instead of methyl chlorid another alkyl halide, as methyl bromid, ethyl chlorid &c., and instead of methyl paratoluenesulfonate another ethereal salt of alphylsulfonic acids may be employed. The alkylation may also be produced by dimethylsulfate, the working remaining the same as in Example II.

(b) *Conversion of the dyestuffs of the type (b) into dyestuffs of the type (c.)*

Example: Twenty parts of diamidoditolyl-methyl-acridinium prepared by alkylating acridine-yellow with methyl chlorid or methyl paratoluenesulfonate are introduced in a cold mixture of twenty parts methyl alcohol and sixty parts concentrated sulfuric acid of 66° Baumé and the whole is heated on an oil-bath for about four hours at 160° to 170° centigrade, being stirred the while. After the mass has cooled it is mixed with six hundred parts water and separated by filtration from a small quantity of an insoluble secondary product. From the filtered deep-red solution the dyestuff is precipitated by common salt and zinc chlorid. In dry state the dyestuff is a brown-red to tile-red powder, which easily dissolves in water with an orange-yellow coloration. Toward alkalies its aqueous solution acts in the same way as the aqueous solution of the dyestuff prepared according to Example I. It dyes tannin-mordanted cotton and leather orange-yellow to orange-red tints, which can hardly be distinguished from the tints furnished by the dyestuff of Example I and possesses the same fastness to alkalies as these latter ones. If in this example the heating is effected at 180° to 190° centigrade, there is obtained a dyestuff of the same properties, but which furnishes more reddish tints and on this point approaches the product derived from patent-phosphin R, according to Example II.

If the diamidoditolyl-methyl-acridinium specified in Example III be replaced by the corresponding diamidoditolylphenyl-methyl-acridinium derived from benzo-flavine or the corresponding ethyl derivatives, dyestuffs of analogous properties are obtained.

The new dyestuffs are difficultly soluble in cold alcohol, more easily soluble in hot alcohol with orange coloration, insoluble in ether and benzene, and soluble in concentrated sulfuric acid of 66° Baumé with a yellow coloration and a greenish-yellow fluorescence.

What I claim is—

1. The process for the manufacture of derivatives of the acridinium series, corresponding probably to the general formula

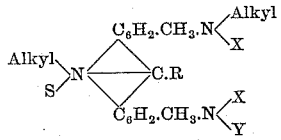

(R signifying hydrogen or phenyl, X and Y standing for hydrogen or alkyl and S for a radical of an acid as Cl, Br, $SO_2\!\!<^{OH}_{O}$, &c.,) which process consists in treating alkylamidoacridin dyestuffs with alkylating agents, substantially as described.

2. As new products, the new orange-yellow to orange-red dyestuffs, belonging to the alkylamidoacridinium series, which are obtained by alkylating alkylamidoacridin dyestuffs and which are not precipitated from their aqueous solutions by the addition of sodium carbonate or ammonia, substantially as described.

3. As a new article of manufacture the orange dyestuff, which can be obtained by methylating alkylamidoacridin dyestuffs known in common by the name "patentphosphin," and which appears, in dry state, as a brownish-red to tile-red powder, easily soluble in water, producing an orange-yellow to orange-red solution, which is not changed by the addition of sodium carbonate or ammonia, which is soluble with difficulty in cold alcohol, but more easily soluble in hot alcohol with an orange coloration, which is insoluble in ether and benzene and soluble in concentrated sulfuric acid of 66° Baumé with a yellow coloration and a greenish-yellow fluorescence, and dyes tannin-mordanted cotton in clear orange-yellow to orange-red shades, fast to the action of alkali, substantially as described.

In witness whereof I have hereunto signed my name, this 17th day of August, 1900, in the presence of the subscribing witnesses.

KARL JEDLICKA.

Witnesses:
CLARENCE GIFFORD,
GEO. GIFFORD,
T. PLATNER,
AMAND RITTER.